(12) United States Patent
Wiegel (10) Patent No.: US 10,940,900 B2
(45) Date of Patent: Mar. 9, 2021

(54) AERODYNAMIC RECAPTURE METHOD AND APPARATUS

(71) Applicant: EkoStinger, Inc., Rochester, NY (US)

(72) Inventor: J. Parr Wiegel, Palmyra, NY (US)

(73) Assignee: EkoStinger, Inc., Rochester, NY (US)

( * ) Notice: Subject to any disclaimer, the term of this patent is extended or adjusted under 35 U.S.C. 154(b) by 0 days.

(21) Appl. No.: 16/545,526

(22) Filed: Aug. 20, 2019

(65) Prior Publication Data
US 2019/0367103 A1 Dec. 5, 2019

Related U.S. Application Data

(63) Continuation of application No. 15/674,191, filed on Aug. 10, 2017, now Pat. No. 10,435,083.

(60) Provisional application No. 62/372,982, filed on Aug. 10, 2016.

(51) Int. Cl.
| | |
|---|---|
| *B62D 25/00* | (2006.01) |
| *B62D 35/00* | (2006.01) |
| *B62D 65/16* | (2006.01) |
| *B62D 29/04* | (2006.01) |
| *B62D 25/18* | (2006.01) |
| *B62D 53/06* | (2006.01) |

(52) U.S. Cl.
CPC ......... *B62D 35/002* (2013.01); *B62D 25/188* (2013.01); *B62D 29/04* (2013.01); *B62D 35/001* (2013.01); *B62D 35/008* (2013.01); *B62D 53/068* (2013.01); *B62D 65/16* (2013.01)

(58) Field of Classification Search
CPC .... B62D 27/06; B62D 35/002; B62D 25/188; B62D 65/16; B62D 53/068; B62D 35/008; B62D 35/001; B62D 29/04
See application file for complete search history.

(56) References Cited

U.S. PATENT DOCUMENTS

| | | | |
|---|---|---|---|
| 3,279,818 A | 10/1966 | Jones | |
| 4,382,606 A * | 5/1983 | Lightle | B62D 25/168 280/847 |
| 5,146,949 A | 9/1992 | Retzloff et al. | |
| (Continued) | | | |

FOREIGN PATENT DOCUMENTS

| | | |
|---|---|---|
| EP | 0310130 A1 | 4/1989 |
| WO | 2012131062 A1 | 10/2012 |

*Primary Examiner* — James A Shriver, II
*Assistant Examiner* — Hilary L Johns
(74) *Attorney, Agent, or Firm* — Timothy W. Menasco, Esq.; Harter Secrest & Emery LLP (57) ABSTRACT

Embodiments of the present disclosure provide a method and apparatus for reducing drag. An exemplary apparatus includes a semitrailer having a main frame extending along a longitudinal axis and a subframe movably connected to the main frame between a first position along the longitudinal axis and a second position along the longitudinal axis. The apparatus further includes an axle assembly attached to the subframe, the axle assembly including an axle, a left wheel set, a right wheel set, and a suspension, and a first recapture device located under the main frame behind and separated from the left wheel set along the longitudinal axis by a given spacing. The apparatus still further includes a second recapture device located under the main frame behind and separated from the right wheel set along the longitudinal axis by a second spacing.

14 Claims, 10 Drawing Sheets

(56) References Cited

U.S. PATENT DOCUMENTS

| | | | |
|---|---|---|---|
| 5,205,590 A * | 4/1993 | Drabing | B62D 25/188 |
| | | | 280/851 |
| 5,460,411 A * | 10/1995 | Becker | B62D 25/168 |
| | | | 280/848 |
| 5,564,750 A | 10/1996 | Bajorek et al. | |
| 5,579,314 A | 11/1996 | Jones | |
| 5,676,389 A * | 10/1997 | Richardson | B62D 25/188 |
| | | | 248/214 |
| 5,783,758 A | 7/1998 | Dudley | |
| 5,786,512 A | 7/1998 | Jones et al. | |
| 6,851,717 B1 | 2/2005 | Andersen | |
| 7,625,013 B2 | 12/2009 | Kellick | |
| RE44,755 E | 2/2014 | Surti | |
| 8,814,253 B1 | 8/2014 | Butler et al. | |
| 9,004,538 B2 | 4/2015 | Eklund et al. | |
| 9,016,912 B1 * | 4/2015 | Gustafson | B60Q 1/0088 |
| | | | 362/485 |
| 9,027,983 B2 | 5/2015 | Butler et al. | |
| 9,284,000 B1 * | 3/2016 | Smith | B62D 25/188 |
| 2002/0109347 A1 * | 8/2002 | Sheppard | B62D 25/168 |
| | | | 280/851 |
| 2003/0011188 A1 | 1/2003 | Andersen | |
| 2005/0040637 A1 | 2/2005 | Wood | |
| 2010/0059982 A1 | 3/2010 | Schubert | |
| 2011/0042932 A1 * | 2/2011 | Vogel | B62D 25/188 |
| | | | 280/848 |
| 2011/0204614 A1 | 8/2011 | Cicansky | |
| 2013/0320658 A1 * | 12/2013 | Eklund | B62D 25/18 |
| | | | 280/848 |

* cited by examiner

AERODYNAMIC RECAPTURE METHOD AND APPARATUS

BACKGROUND OF THE INVENTION

Field of the Invention

Exemplary embodiments of the present disclosure provide an apparatus for reducing drag. Exemplary embodiments of the present disclosure relate more particularly to an aerodynamic apparatus for reducing drag.

Description of Related Art

Vehicles are typically designed to increase fuel efficiency. These designs can include improvements in the combustion process and improvements to the aerodynamics of the vehicle. In other words, many vehicles are designed such that they reduce wind resistance when in motion. However, there is a need for improved designs to reduce drag from wind resistance.

BRIEF SUMMARY OF THE INVENTION

In view of the foregoing, it is an object of the present disclosure to provide a method and apparatus for reducing drag.

A first exemplary embodiment of the present disclosure provides an apparatus for reducing drag. The apparatus includes a semitrailer having a main frame extending along a longitudinal axis and a subframe movably connected to the main frame between a first position along the longitudinal axis and a second position along the longitudinal axis, and an axle assembly attached to the subframe, the axle assembly including an axle, a left wheel set, a right wheel set, and a suspension. The apparatus further includes a first recapture device located under the main frame behind and separated from the left wheel set along the longitudinal axis by a given spacing, the first recapture device operable to expand to an expanded position and collapse to a collapsed position such that the given spacing is maintained, and a second recapture device located under the main frame behind and separated from the right wheel set along the longitudinal axis by a second spacing, the second recapture device operable to expand to an expanded position and collapse to a collapsed position such that the second spacing is maintained.

A second exemplary embodiment of the present disclosure provides a method of manufacture. The method includes providing a semitrailer having a main frame extending along a longitudinal axis and a subframe movably connected to the main frame between a first position along the longitudinal axis and a second position along the longitudinal axis, and providing an axle assembly attached to the subframe, the axle assembly including an axle, a left wheel set, a right wheel set, and a suspension. The method further includes providing a first recapture device located under the main frame behind and separated from the left wheel set along the longitudinal axis by a given spacing, the first recapture device operable to expand to an expanded position and collapse to a collapsed position such that the given spacing is maintained, and providing a second recapture device located under the main frame behind and separated from the right wheel set along the longitudinal axis by a second spacing, the second recapture device operable to expand to an expanded position and collapse to a collapsed position such that the second spacing is maintained.

A third exemplary embodiment of the present disclosure provides an apparatus for reducing drag. The apparatus includes a semitrailer having a main frame extending along a longitudinal axis and a subframe movably connected to the main frame between a first position along the longitudinal axis and a second position along the longitudinal axis, and an axle assembly attached to the subframe, the axle assembly including an axle, a left wheel set, a right wheel set, and a suspension. The apparatus further includes a first mud flap located under the main frame behind and separated from the left wheel set along the longitudinal axis by a given spacing, the first mud flap comprising a plurality of vents operable to redirect air flow downward and toward the right wheel set, and a second mud flap located under the main frame behind and separated from the right wheel set along the longitudinal axis by a second spacing, the second mud flap comprising a plurality of vents operable to redirect air flow downward and toward the left wheel set.

A fourth exemplary embodiment of the present disclosure provides a method of manufacture. The method includes providing a semitrailer having a main frame extending along a longitudinal axis and a subframe movably connected to the main frame between a first position along the longitudinal axis and a second position along the longitudinal axis, and providing an axle assembly attached to the subframe, the axle assembly including an axle, a left wheel set, a right wheel set, and a suspension. The method further includes providing a first mud flap located under the main frame behind and separated from the left wheel set along the longitudinal axis by a given spacing, the first mud flap comprising a plurality of vents operable to redirect air flow downward and toward the right wheel set, and providing a second mud flap located under the main frame behind and separated from the right wheel set along the longitudinal axis by a second spacing, the second mud flap comprising a plurality of vents operable to redirect air flow downward and toward the left wheel set.

The following will describe embodiments of the present disclosure, but it should be appreciated that the present disclosure is not limited to the described embodiments and various modifications of the invention are possible without departing from the basic principles. The scope of the present disclosure is therefore to be determined solely by the appended claims.

DETAILED DESCRIPTION OF THE INVENTION

Exemplary embodiments of the present disclosure provide an aerodynamic recapture device that is operable to increase the fuel efficiency of trucks, trailers, and trailer systems by up to 5%. Embodiments provide an airflow recapture device that uses the inline airflow of a truck or trailer generated by forward mounted devices (e.g., fairings) and carries that airflow out and away from the rear bumper and rear doors of the trailer. By controlling the airflow at the rear of the trailer, embodiments of the present disclosure allow the airstream to remain constant without impact or turbulent flow hitting (or pulling) on the trailer's back end. Exemplary embodiments of the present disclosure are operable to improve performance of any device mounted in front of the wheels of a truck or trailer. Embodiments of the present disclosure provide a recapture device operable to apply a forward force from passed air on the truck or trailer to further reduce fuel usage of the truck or trailer. Embodiments also provide a mud flap that is operable to reduce rear mist from a trailer. Embodiments provide a mud flap that operably redirects air flow down and towards the center of a trailer. Embodiments further provide a recapture device with a mud flap to reduce drag from air flow.

By increasing the miles per gallon that trucks and tractor trailers get on a daily basis, a recapture device can provide fuel improvements to each and every truck and/or trailer, saving millions of gallons of fuel and reducing the amount greenhouse gases expelled into the atmosphere.

Embodiments of the present disclosure provide two types of recapture devices. A first embodiment includes a fixed recapture device that can be mounted just behind the rear wheels of a truck or trailer. In this embodiment, the recapture device will remain stationary relative to the rear wheels at a fixed in distance from the rear wheels. A second embodiment includes an expandable recapture device that can extend and collapse along the longitudinal axis of the truck or trailer corresponding to movement of the wheels of the truck or trailer relative to the truck or trailer.

Figure 1:
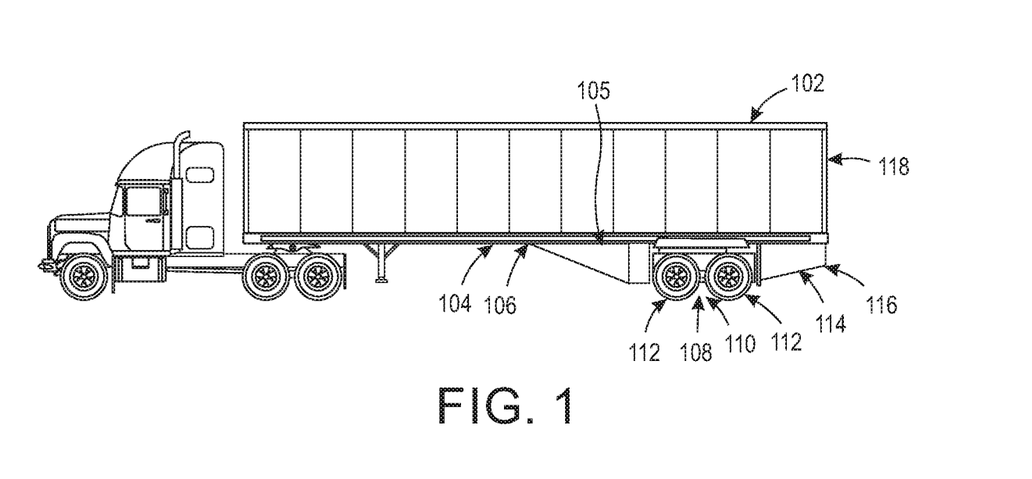
FIG. 1 is a side view of an exemplary trailer with a recapture device suitable for use in practicing exemplary embodiments of the present disclosure.
Figure 2:
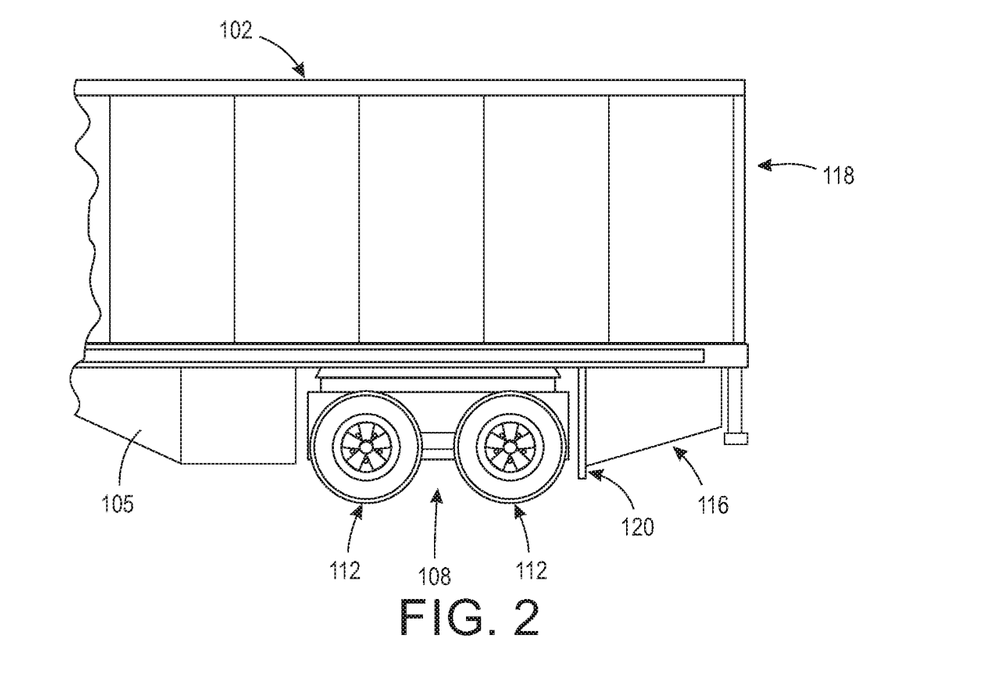
FIG. 2 is a close-up side view of the back of an exemplary trailer with a recapture device suitable for use in practicing exemplary embodiments of the present disclosure.

Referring to FIGS. 1 and 2, shown are side views of an exemplary trailer with a recapture device suitable for use in practicing exemplary embodiments of the present disclosure. Shown in FIGS. 1 and 2 is a semitrailer 102 that includes a main frame 104 extending along the longitudinal axis of semitrailer 102. Semitrailer 102 includes any of the standard components known in the art including, but not limited to a coupling such as king pin, lighting, hoses, cabling, or wiring. The semitrailer 102 can also include landing gear as known in the art. It should be appreciated that semitrailer 102 can be any of the known configurations including but not limited to dump trailers, container semi-trailers, chip vans, refrigerated, log, flatbed, or tank semi-trailers.

Semitrailer 102 includes a subframe 106 movably connected to the main frame 104. In one configuration, the subframe 106 is movably connected to the main frame 104 by means of a plurality of tracks, such that the subframe 106 can move along the plurality of tracks to be located at any of a number of positions along the longitudinal axis of semitrailer 102.

The subframe 106 is operably coupled to an axle assembly 108. The axle assembly 108 includes at least an axle 110, a plurality of wheels 112, and a suspension. Embodiments of the axle assembly 108 includes a combination of brakes, hydraulics, air lines, and connections to air ride systems. It should be appreciated that the axle assembly 108 can include one or more axles, wherein each axle can include two or more wheels. It should also be appreciated that motion of the axle assembly 108 relative to the main frame 104 locates the wheels 112 at correspondingly different locations along the longitudinal axis of semitrailer 102.

Also shown in FIGS. 1 and 2 is recapture system 114 located under the main frame 104 behind the left and right wheels 112 of semitrailer 102. Recapture system 114 includes two separate recapture devices 116 (shown in FIG. 12) each spaced a given distance behind the right and left wheels 112 along the longitudinal axis of semitrailer 102, respectively. Recapture devices 116 reduces drag with respect to passing airflow, such as induced when semitrailer 102 is being towed by a tractor. Each recapture device 116 extends along the longitudinal axis of semitrailer 102 from adjacent to the left and right wheels 112 of the axle assembly 108 to adjacent the rear end 118 of semitrailer 102. In the embodiments depicted in FIGS. 1 and 2, the recapture devices 116 are fixed relative semitrailer 102 such that when wheels 112 are moved, recapture devices 116 maintain a given spacing from wheels 112 and thus move with wheels 112 and axle assembly 108.

Figure 9:
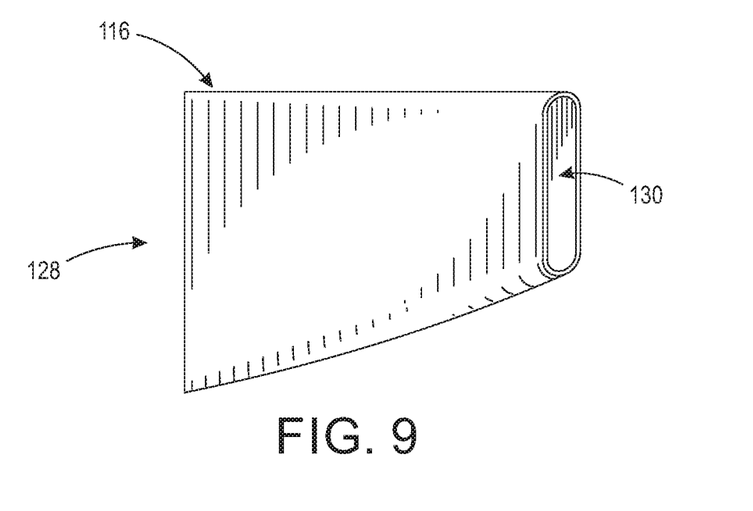
FIG. 9 is a side view of an exemplary recapture device suitable for use in practicing exemplary embodiments of the present disclosure.
Figure 10:
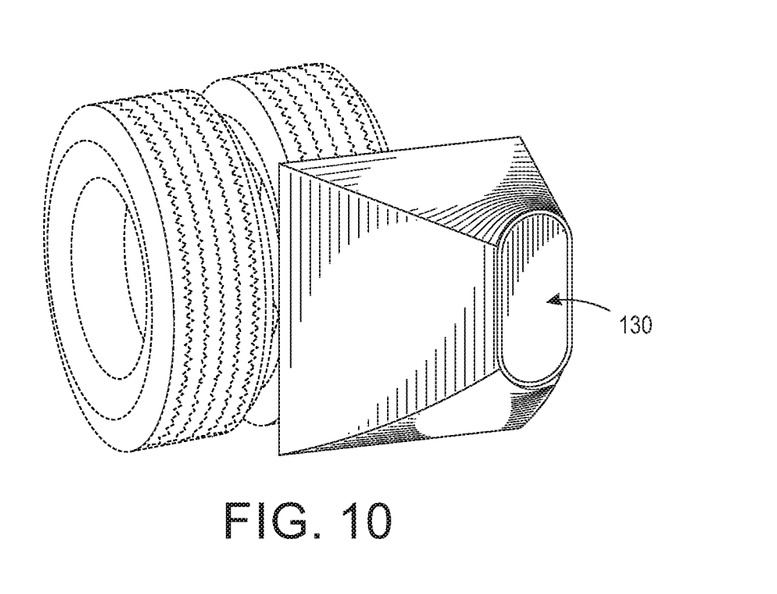
FIG. 10 is a front view of an exemplary recapture device suitable for use in practicing exemplary embodiments of the present disclosure.
Figure 11:
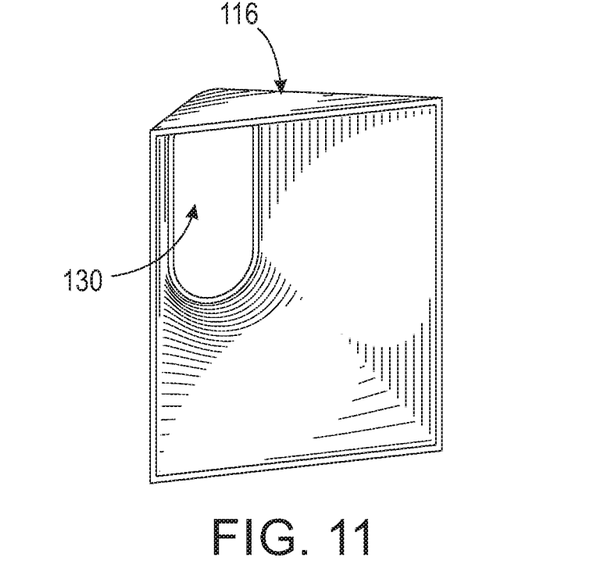
FIG. 11 is rear view of an exemplary recapture device suitable for use in practicing exemplary embodiments of the present disclosure.
Figure 13:
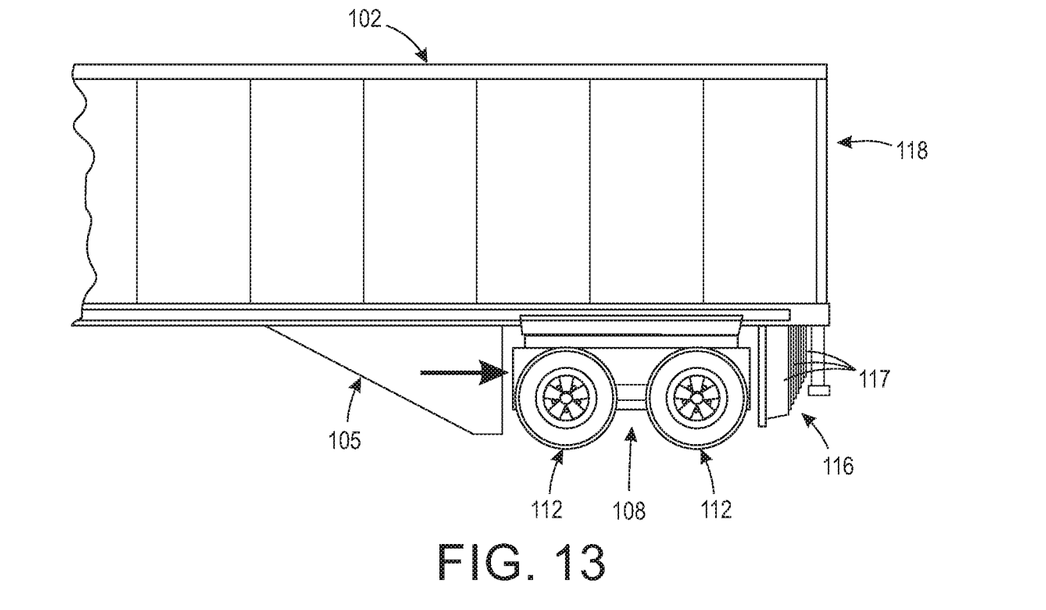
FIG. 13 is another close-up side view of the back of an exemplary trailer with a recapture device in the collapsed position suitable for use in practicing exemplary embodiments of the present disclosure.

Shown in FIGS. 9, 10 and 11 are a side, front, and rear views, respectively of an exemplary recapture device 116. The recapture device shown in FIGS. 9, 10, and 11 is an exemplary fixed recapture device 116 that can be made of a semi-rigid material (e.g., rubber, thermoplastic, or polyvinyl chloride (PVC)). As illustrated in FIGS. 9-11, recapture device 116 is cone shaped with a hollow center that fluidly connects a front hole and a rear hole in the back of recapture device 116. Embodiments of recapture device 116 shown in FIGS. 9, 10, and 11 are flexible and semi-rigid such that they are operable to maintain their cone shape while a trailer is in motion, but can be collapsed when axle assembly 108 is moved towards the rear of the trailer (as shown in FIGS. 4 and 13).

Figure 3:
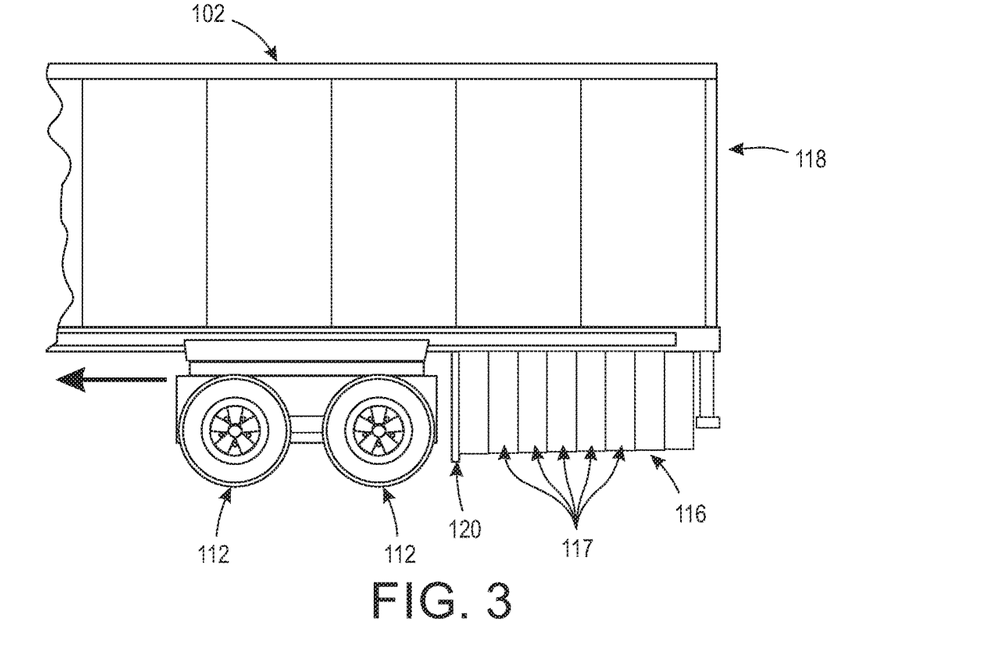
FIG. 3 is a close-up side view of the back of an exemplary trailer with an expandable recapture device in an expanded position suitable for use in practicing exemplary embodiments of the present disclosure.
Figure 4:
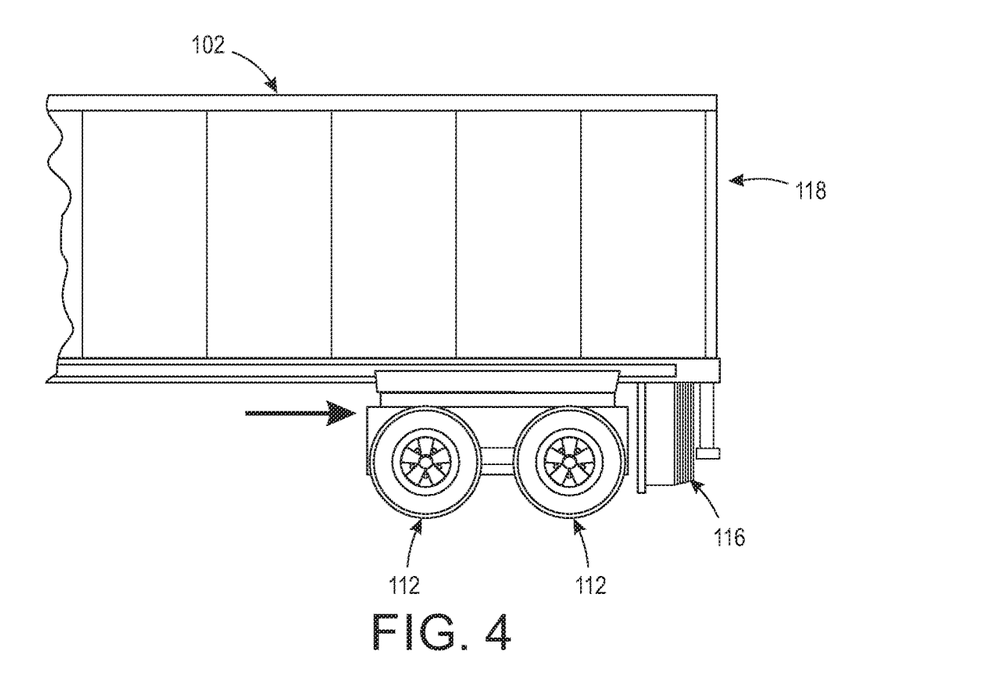
FIG. 4 is a close-up side view of the back of an exemplary trailer with an expandable recapture device in a collapsed position suitable for use in practicing exemplary embodiments of the present disclosure.
Figure 5:
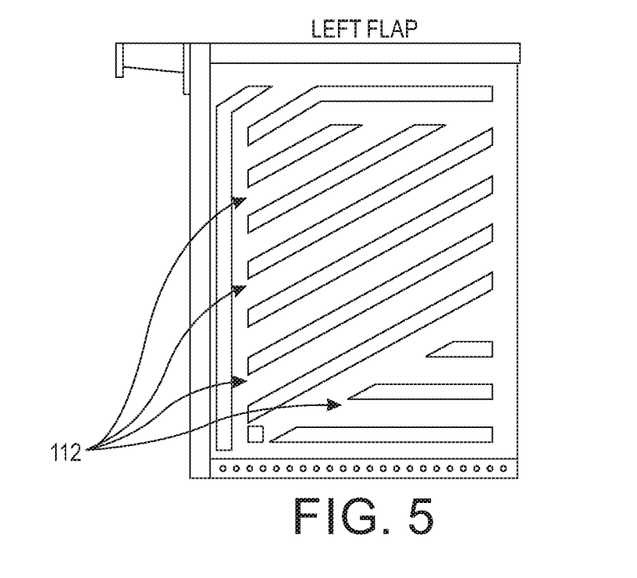
FIG. 5 is an exemplary left flap for use behind the rear wheels of a trailer on a recapture device suitable for use in practicing exemplary embodiments of the present disclosure.
Figure 6:
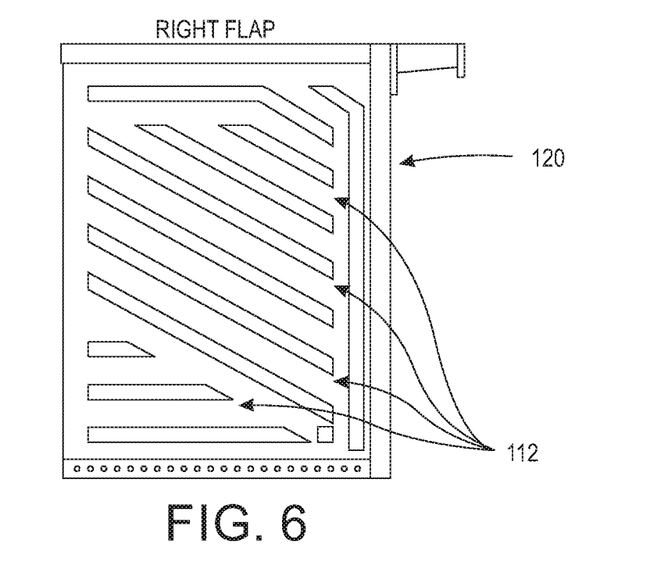
FIG. 6 is an exemplary right flap for use behind the rear wheels of a trailer on a recapture device suitable for use in practicing exemplary embodiments of the present disclosure.
Figure 14:
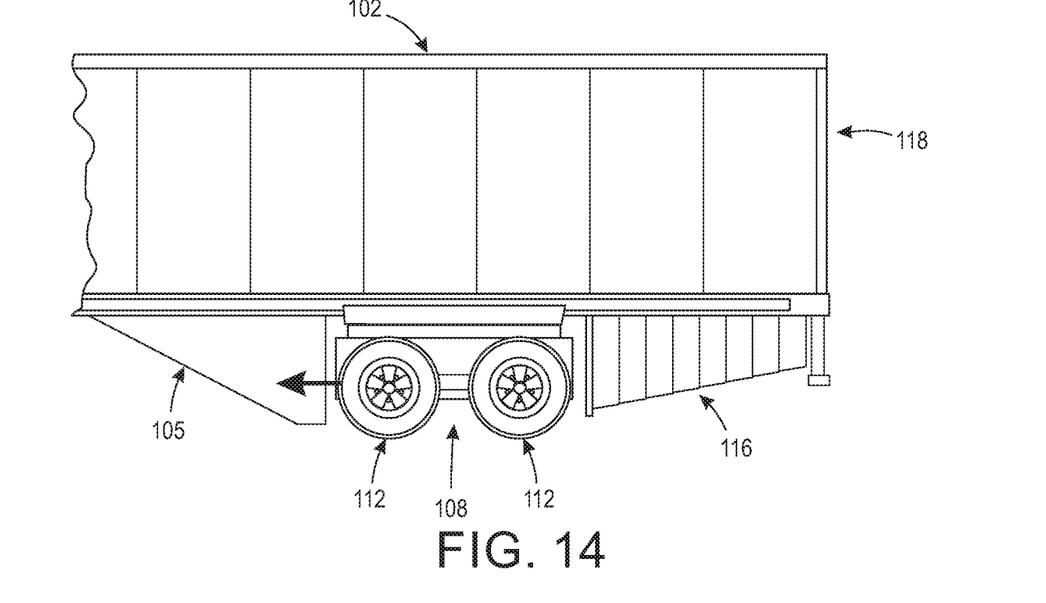
FIG. 14 is another close-up side view of the back of an exemplary trailer with a recapture device in the expanded position suitable for use in practicing exemplary embodiments of the present disclosure.
Figure 15:
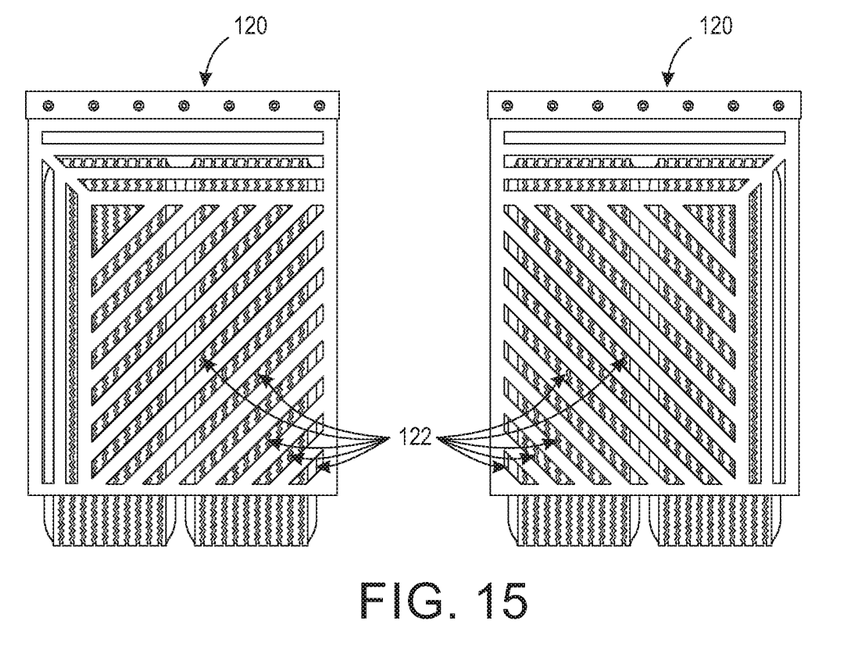
FIG. 15 is a front view of an exemplary right and left mud flap suitable for use in practicing exemplary embodiments of the present disclosure.
Figure 16:
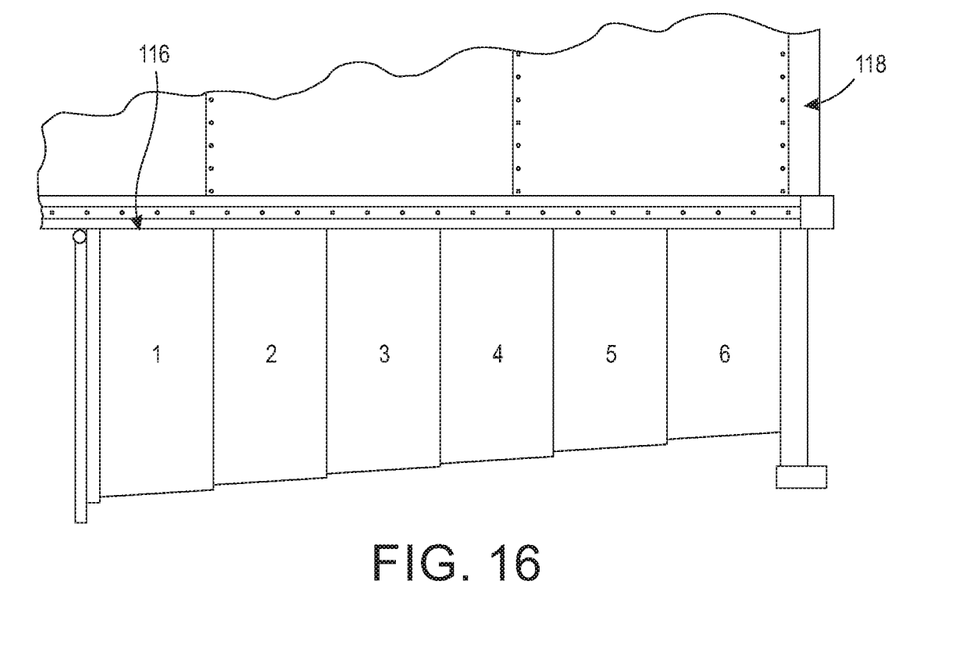
FIG. 16 is a side view of an exemplary expandable and collapsible recapture device suitable for use in practicing exemplary embodiments of the present disclosure.
Figure 17:
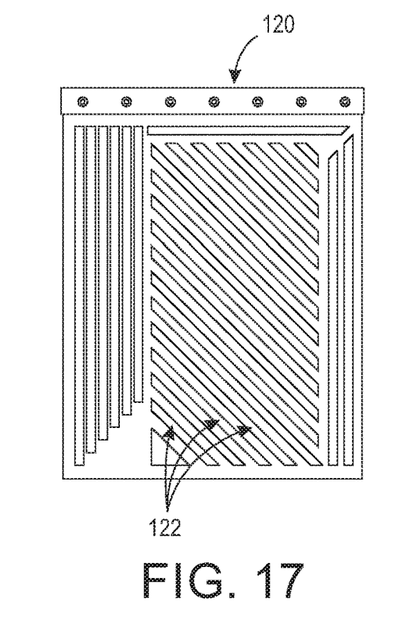
FIG. 17 is a front view of an exemplary mud flap suitable for use in practicing exemplary embodiments of the present disclosure.

Referring to FIGS. 3, 4, 13, and 14, shown is a close-up side view of the back of an exemplary trailer with an expandable recapture device 116 suitable for use in practicing exemplary embodiments of the present disclosure. Shown in FIGS. 3, 4, 13, and 14 are semitrailer 102 having an axle assembly 108 with wheels 112 and recapture devices 116 located behind the wheels 112. Recapture devices 116 shown in FIGS. 3, 4, 13, and 14 are collapsible and expandable such the location of the back end of recapture devices 116 is maintained relative to the rear end 118 of semitrailer 102, and a given spacing between wheels 112 and recapture devices 116 is maintained when axle assembly 108 with wheels 112 are moved relative to main frame 104. In FIGS. 3 and 14, recapture device 116 is in an extended position. In FIGS. 4 and 14, recapture device 116 is in the collapsed position. In the embodiments shown in FIGS. 3, 4, 13, and 14 recapture device 116 can include a series of interconnected panels 117 that are moveable relative to one another such that recapture device 116 can operably move from a collapsed position to an expanded position and then back to a collapsed position with and in response to movement of axle assembly 108 relative to semitrailer 102. A close-up view of recapture device 116 in the expanded position is also shown in FIG. 16. As shown in FIG. 16, recapture device 116 includes a plurality of panels (numbered 1-6) that are moveable relative to one another such that recapture device 116 can be expanded or collapsed. As shown in FIG. 16, recapture device 116 is operably affixed to the rear bumper of semitrailer 102 such that recapture device 116 can expand or collapse relative to movement of axle assembly 108.

Figure 8:
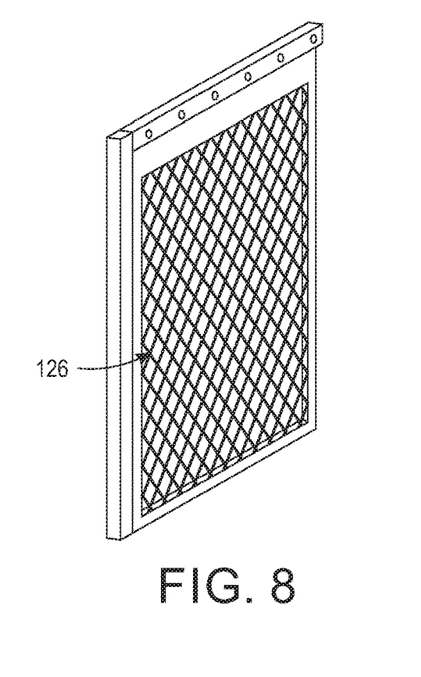
FIG. 8 is a perspective view of an exemplary vented mud flap suitable for use in practicing exemplary embodiments of the present disclosure.

Shown in FIGS. 5, 6, 15, and 17 are a semi-permeable mud flap 120 adjacent to wheels 112. Embodiments of mud flap 120 provide a dual purpose. First, mud flap 120 is operable to reduce drag from passing airflow on a trailer by redirecting a flow of air downward and toward the center of the longitudinal axis of a trailer, such as semitrailer 102. Second, mud flap 120 is operable to reduce the rear mist produced from the wheels 112 of semitrailer 102. Mud flap 120 includes a plurality of vents 122 operable to direct a flow of air and mist down and towards the center axle assembly 108. Vents 122 provide a series of holes that allow a flow of air through vents 122. In one embodiment, mud flap 120 can include a screen 126 (shown in FIG. 8) that allows the flow of air and/or fluid through mud flap 120. Embodiments of mud flap 120 are operable to reduce drag from air when semitrailer is in motion by redirecting passing air and mist down and towards the center of the longitudinal axis of semitrailer 102. Embodiments of mud flap 120 are also operable to reduce road mist created by semitrailer 102 and wheels 112.

Figure 7:
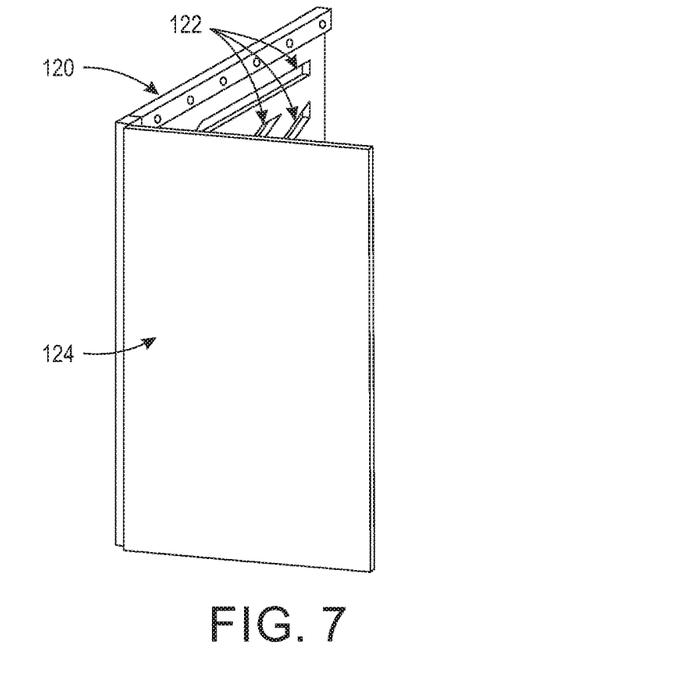
FIG. 7 is a perspective view of an exemplary mud flap with a recapture panel suitable for use in practicing exemplary embodiments of the present disclosure.

In one embodiment, mud flap 120 and recapture device 116 are combined such that mud flap 120 covers the front portion of recapture device 116 behind wheels 112 (e.g., an intake hole 128 shown in FIG. 9, FIG. 10, and FIG. 11). As shown in FIGS. 9, 10 and 11 intake hole 128 is fluidly connected to rear hole 130 by a hollow center. Embodiments provide that mud flap 120 can include a recapture panel 124 (shown in FIG. 7) operable to redirect a portion of passing air away from recapture device 116.

Figure 12:
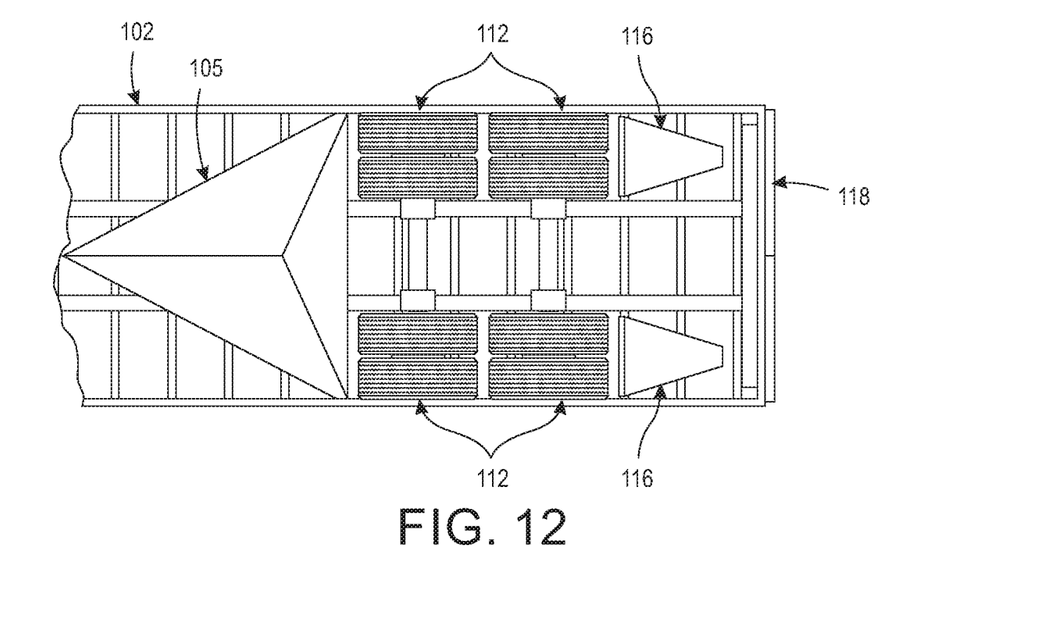
FIG. 12 is a bottom view of a semitrailer with an exemplary recapture system suitable for use in practicing exemplary embodiments of the present disclosure.

Shown in FIGS. 1, 2, and 12 is fairing 105 located under the main frame 104 and spaced from the axle assembly 108 along the longitudinal axis of semitrailer 102. Fairing 105 produces a smooth outline and reduces drag with respect to passing airflow. The fairing 105 can extend along the longitudinal axis of semitrailer 102 from adjacent the landing gear to adjacent the wheels 112 of axle assembly 108. Embodiments provide that fairing 105 can be fixed relative to main frame 104 or movable relative to main frame 104 such that as the subframe 106 (and axle assembly 108) are moved along the longitudinal axis of semitrailer 102, a given spacing between axle assembly 108 and fairing 105 is maintained. That is, the position of the fairing 105 relative to the axle assembly 108 is independent of the position of the axle assembly 108 relative to the main frame 104.

Figure 18:
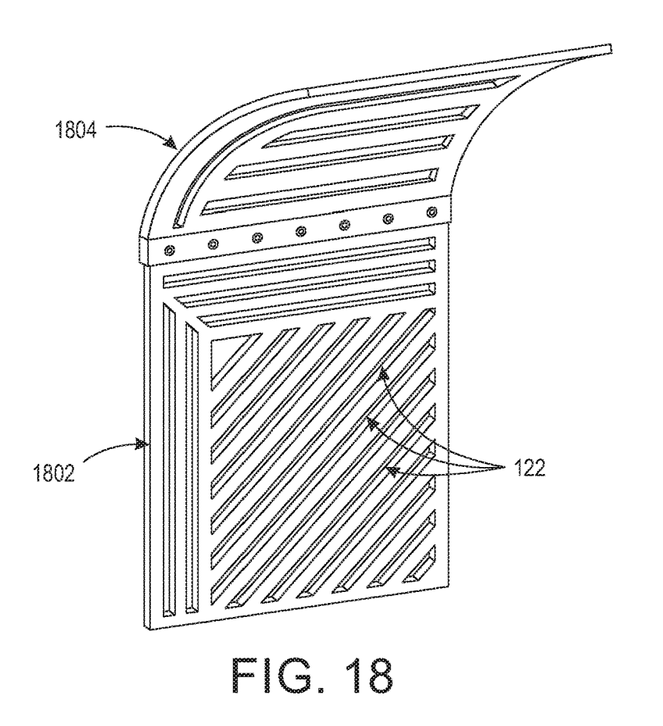
FIG. 18 is a front view of an exemplary extended mud flap suitable for use in practicing exemplary embodiments of the present disclosure.
Figure 19:
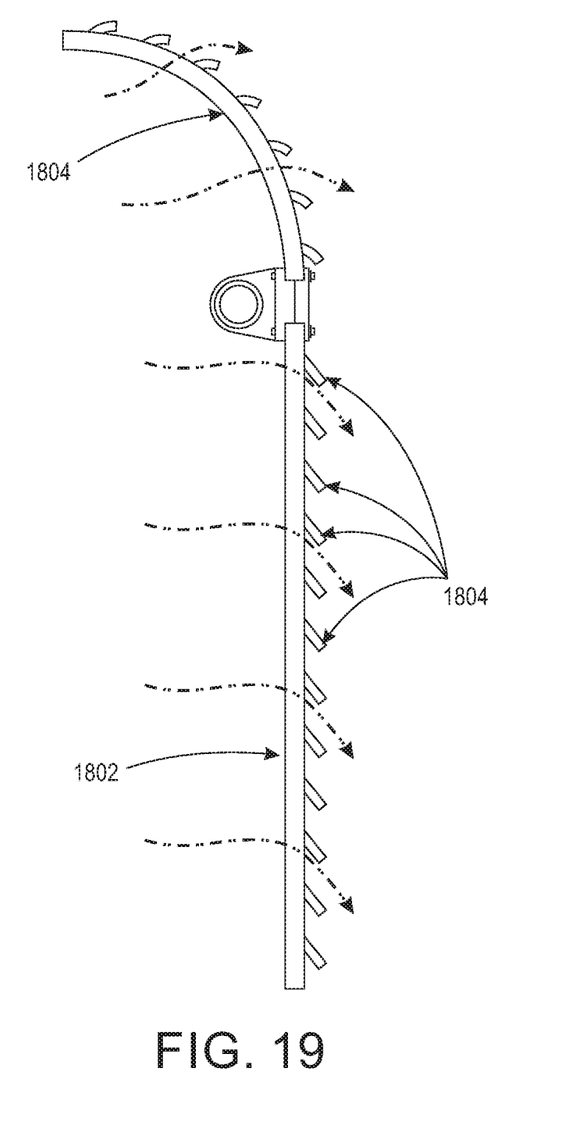
FIG. 19 is a side view of an exemplary extended mud flap suitable for use in practicing exemplary embodiments of the present disclosure.

Referring to FIG. 18, shown is a front view of an extended mud flap 1802 with vents 122. As illustrated in FIG. 18, extended mud flap 1802 includes a curved portion 1804 whose surface is curved such that it corresponds to the contours of rear wheels 112 of semitrailer 102. In practice, as mist from the road is sprayed by wheels 112, the mist is captured in by vents 122 and curved portion 1804. The mist is then directed by extended mud flap 1802 with curved portion 1804 toward the ground utilizing the air pressure created by forward momentum and the pressure from the wheel 112. FIG. 19 illustrates a side view of extended mud flap 1802 with curved portion 1804.

It is to be understood that any feature described in relation to any one embodiment may be used alone, or in combination with other features described, and may also be used alone, or in combination with one or more features of any other of the embodiments, or any combination of any other of the embodiments. The presently disclosed embodiments are therefore considered in all respects to be illustrative and not restrictive. Furthermore, equivalents and modifications not described above may also be employed without departing from the scope of this disclosure, which is defined in the accompanying claims.

The invention claimed is:

1. An apparatus for reducing drag, the apparatus comprising:
    (a) a semitrailer having a main frame extending along a longitudinal axis and a subframe movably connected to the main frame between a first position along the longitudinal axis and a second position along the longitudinal axis;
    (b) an axle assembly attached to the subframe, the axle assembly including an axle, a left wheel set, a right wheel set, and a suspension;
    (c) a first recapture device located under the main frame separated from the left wheel set along the longitudinal axis by a given spacing, wherein the first recapture device is a first mud flap comprising a first mud flap first portion and a first mud flap curved portion, wherein the first mud flap first portion and the first mud flap curved portion each comprise a plurality of vents operable to redirect air flow downward and toward the right wheel set; and (d) a second recapture device located under the main frame separated from the right wheel set along the longitudinal axis by a second spacing, wherein the second recapture device is a second mud flap comprising a second mud flap first portion and a second mud flap curved portion, wherein the second mud flap first portion and the second mud flap curved portion each comprise a plurality of vents operable to redirect air flow downward and toward the left wheel set, wherein the first mud flap curved portion has a curved surface corresponding contours of the left wheel set, and wherein the second mud flap curved portion has a second curved surface corresponding to contours of the right wheel set.

2. The apparatus according to claim 1, wherein the first recapture device and the second recapture device are comprised of at least one of rubber, thermoplastic, and polyvinyl chloride.

3. The apparatus according to claim 1, wherein the first recapture device comprises a first permeable screen, and the second recapture device comprises a second permeable screen.

4. The apparatus according to claim 3, wherein the first and the second permeable screens comprise air directing structures.

5. The apparatus according to claim 1, wherein the first recapture device and the second recapture device are operable to maintain a given spacing from a rear of the semitrailer.

6. The apparatus according to claim 1, wherein the first recapture device and the second recapture device are slidably connected to the main frame.

7. The apparatus according to claim 1, wherein the first recapture device and the second recapture device are slidably connected to the axle assembly.

8. The apparatus according to claim 1, wherein the subframe can be located at any of a multitude of positions.

9. The apparatus according to claim 1, wherein the given spacing and the second spacing is adjustable within a predetermined range of motion.

10. The apparatus according to claim 1, wherein the first and second recapture devices are connected to the subframe at the given spacing.

11. An apparatus for reducing drag, the apparatus comprises:
(a) a semitrailer having a main frame extending along a longitudinal axis and a subframe movably connected to the main frame between a first position along the longitudinal axis and a second position along the longitudinal axis;
(b) an axle assembly attached to the subframe, the axle assembly including an axle, a left wheel set, a right wheel set, and a suspension;
(c) a first mud flap located under the main frame behind and separated from the left wheel set along the longitudinal axis by a given spacing, the first mud flap comprising a first curved portion having a curved surface that corresponds to contours of the left wheel set, the first mud flap including the first curved portion comprising a plurality of vents operable to redirect air flow downward and toward the right wheel set; and
(d) a second mud flap located under the main frame behind and separated from the right wheel set along the longitudinal axis by a second spacing, the second mud flap comprising a second curved portion having a curved surface that corresponds to contours of the right wheel set, the second mud flap including the second curved portion comprising a plurality of vents operable to redirect air flow downward and toward the left wheel set.

12. The apparatus according to claim 11, wherein the first mud flap is a permeable screen, and the second mud flap is a permeable screen.

13. The apparatus according to claim 11, wherein the first mud flap is affixed to a panel that extends from a left edge of the first mud flap, the panel operable to redirect a flow of air toward the left edge of the first mud flap, and wherein the second mud flap is affixed to a second panel that extends from a right edge of the second mud flap, the second panel operable to redirect a flow of air toward the right edge of the second mud flap.

14. The apparatus according to claim 11, wherein the first mud flap and the second mud flap comprises a plurality of light emitting diodes.

* * * * *